United States Patent [19]
Conway

[11] 3,790,140
[45] Feb. 5, 1974

[54] APPARATUS FOR AERATING WATER

[76] Inventor: Robert W. Conway, 7450 Brecksville Rd., Independence, Ohio 44131

[22] Filed: Jan. 22, 1971

[21] Appl. No.: 108,790

[52] U.S. Cl............. 261/62, 261/124, 261/DIG. 75
[51] Int. Cl............................................. B01f 3/04
[58] Field of Search ...... 261/122, 124, 62, DIG. 75, DIG. 56; 210/170, 220; 61/1, 19, 20

[56] References Cited
UNITED STATES PATENTS

| | | | |
|---|---|---|---|
| 873,435 | 12/1907 | Herschel | 61/19 |
| 1,285,494 | 11/1918 | Wallace | 261/122 UX |
| 1,601,860 | 10/1926 | Johnson | 261/122 |
| 1,772,347 | 8/1930 | Gollman | 261/122 UX |
| 2,066,544 | 1/1937 | Shaw | 261/DIG. 56 |
| 2,241,337 | 5/1941 | Work | 261/124 X |
| 3,417,961 | 12/1968 | Shorrock | 261/62 UX |
| 3,489,396 | 1/1970 | D'Aragon | 261/25 |

FOREIGN PATENTS OR APPLICATIONS

| | | | |
|---|---|---|---|
| 249,654 | 4/1926 | Great Britain | 261/DIG. 75 |
| 778,701 | 1/1935 | France | 210/220 |

*Primary Examiner*—Robert Halper

[57] ABSTRACT

Apparatus for aerating a stream of water under a natural pressure head that comprises a venturi including upper and lower gate members connected to the atmosphere for restricting the flow of water. One of the gate members is movable with respect to the other. A foraminous air diffuser is positioned between the upper and lower gate members. A screen is positioned downstream of the upper gate for retarding movement of the air bubbles produced to the water surface.

3 Claims, 4 Drawing Figures

APPARATUS FOR AERATING WATER

The present invention relates to the aeration of a stream, e.g., a river, of water to decrease the level of waste or pollutants in the water.

The present invention provides a new and improved, simple and low cost apparatus for aerating a stream of water. The present invention aerates water flowing in a stream under the influence of a natural pressure head by using the natural head of water to force a flow of water through a venturi device in the stream. If a natural water head is not already in existence, means may be provided to block the flow of the water and thereby provide a natural pressure head in the stream of water.

The venturi device used in the present invention includes a restricting portion through which the stream of water flows. As the water flows through the restricting portion of the venturi device, the velocity of the water increases while the pressure of the water decreases in that portion. By connecting the restricting portion to the atmosphere, the decreased pressure of the water flowing through the restricting portion draws air into the water flowing therethrough. The air is broken into fine bubbles and remains in the stream of water through the venturi device so that it is constantly being dissolved in the water passing through the venturi.

The air bubbles and air dissolved in the water continues to flow in the stream of water and increases the amount of air in the water. By increasing the amount of air in the water, the level of pollution of the water is decreased.

The present invention does not require operating parts to move water or to pump gas, nor does it require gas generators. In addition, the system of the present invention does not require any electrical or other power during operation thereof. This enables the system to be positioned in any geographic location without requiring power at that location. Thus, the water may be aerated in several different places close to the source of pollution and thereby eliminate pollution downstream. By not requiring electrical power, the present invention also provides the advantages of eliminating the possibility of electrical shock of those within the proximity of the aerating device and requiring the constant cost of power during its operation thereof. Since this associated equipment is not required, the device of the present invention does not require a significant amount of maintenance. The system of the present invention also allows for aeration of great volumes of water and thereby significantly increases its effectiveness for mass purification of water. The system of the present invention also keeps the air bubbles drawn into the water submerged for a longer period of time so that a greater quantity of the air bubbles are dissolved in the water. The aerating system of the present invention also provides a means to control the flow of water in a stream and consequently control flood conditions when a man-made dam is provided for creating a natural pressure head in the stream.

Accordingly, it is an object of the present invention to provide a new and improved apparatus for aerating a stream of water by venturi action while eliminating the need for associated equipment to move the water through the venturi.

It is another object of the present invention to provide a new and improved method and apparatus for aerating a stream of water which is economical during operation and does not require constant operating power to move water through the venturi, has a low maintenance factor and is capable of aerating great volumes of water.

It is yet another object of the present invention to provide a new and improved apparatus for aerating a stream of water by providing a venturi which receives water under a natural pressure head and restricts the water as it flows through the venturi to increase the velocity and decrease the pressure of the water flowing therethrough and connecting a portion of the venturi having water of a decreased pressure flowing therethrough with the atmosphere to draw air from the atmosphere into the flow of the water through the venturi to thereby aerate the water.

It is yet another object of the present invention to provide a new and improved apparatus for aerating a stream of water which is capable of keeping air bubbles submerged for an increased period of time to allow for a greater quantity of air to be dissolved in the water.

It is a further object of the present invention to provide a new and improved apparatus for aerating a stream of water which is capable of controlling the flow of water down the stream and as a result the flood conditions of the stream.

Further objects, advantages and features of the present invention will be apparent to those skilled in the art to which it relates from the following detailed description made with reference to the accompanying drawings forming a part of this specification and in which.

Figure 1:
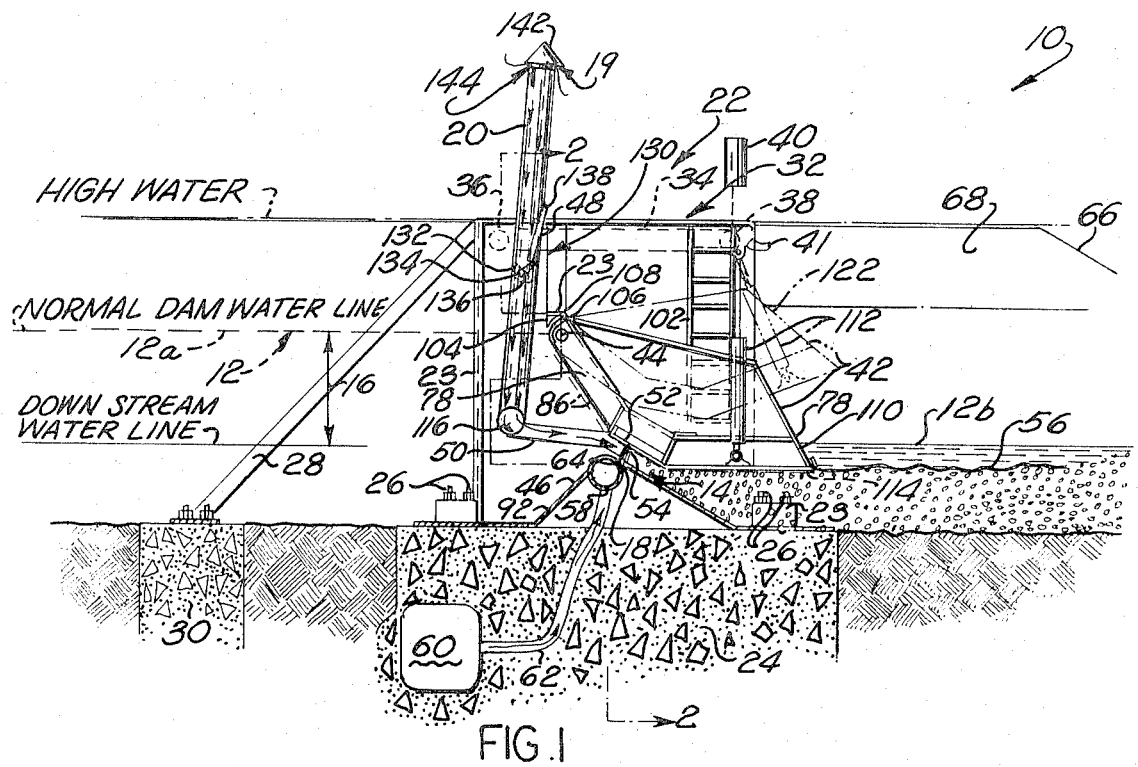
FIG. 1 is a side sectional view of one aerating apparatus of the present invention.

The present invention provides a apparatus for aerating a stream of water by venturi action. The venturi system of the present invention eliminates the need for associated equipment to move the water through the venturi and the maintenance associated with such additional equipment. The present invention also allows great volumes of water to be aerated without requiring constant operating power. The present invention may be applied to aeration systems of a wide variety of designs and constructions and for purposes of illustration is described in the drawings as applied to the aerating apparatus 10 as shown in FIG. 1.

The apparatus 10 of the present invention aerates water flowing in a stream 12 under the influence of a natural pressure head 16 by providing a venturi device 14 through which the water flows as a result of the natural pressure head. The venturi device 14 has a restricting portion 18 through which the water flows to draw air from the atmosphere into the stream of water. As the water flows through the restricting portion 18, the velocity of the water increases while the pressure of the water decreases. By connecting the restricting portion 18 to the atmosphere through the conduit means 20, the decreased pressure of the water flowing through the restricting portion 18 draws air from the atmosphere into the stream. This air is entrained by the water and flows with the water through the venturi 14 so that it is constantly dissolved in the water.

It should be understood that a natural pressure head is necessary to move the water through the venturi 14 and may occur in a stream of water flowing under the influence of gravity. The amount of the natural pressure head is dependent on the difference in levels through which the water moves from an upstream level 12a to a downstream level 12b, as seen in FIG. 1. If the difference in levels or the velocity of the water is sufficient, the venturi device 14 may be positioned in the stream of water and since the natural pressure head 16 is sufficient the water will draw air into its stream.

If such a pressure head is not sufficient, a natural pressure head of a greater magnitude may be provided by blocking the flow of the stream so that the upstream level 12a increases with respect to the downstream level 12b. Many devices may be used to block the stream.

One such blocking device is shown as a dam, generally indicated at 22 in FIG. 1. The frame 23 of the dam 22 is secured to the foundation 24 in the river bed by any suitable means such as the retaining fasteners 26. Further support of the frame 23 is provided by the support members 28 which are secured to the upstream portion of the frame 23 and to their own respective foundations 30 in the river bed.

The support members 28 also provide protection for the venturi device 14 by blocking the flow of logs or ice therethrough. To remove the logs or ice from the upstream side of the dam 22, the dam is closed in a manner hereinafter described so that the upstream water level 12a rises to lift the logs or ice to the top of the dam so that they may be removed.

When the debris, logs and ice, reach the top of the dam, a conveyor device generally indicated at 32, is provided to remove the floating material. The conveyor device 32 includes a conveyor belt 34 supported around the rollers 36, 38. The roller 38 is drivingly connected to a drive means, schematically indicated at 40 in FIG. 1. A trough 41 is mounted to the frame 23 so that when the conveyor belt 34 is driven by the motor 40, the debris is deposited in the trough 41 to flow to a collection point.

The venturi device 14 is incorporated into the dam 22 and is positioned so as to maximize the amount of air entrained by the water flowing therethrough. The venturi device 14 is also designed to control various levels of the stream 12 in which it is operating.

The venturi device 14 includes an upper gate 42 pivotally mounted on the frame 13 about the axis 44 as will be hereinafter described in greater detail. The upper gate 42 defines a portion of the restricting portion 18 and serves to vary the size of the restricting portion 18 and the various levels of the water. The venturi device 14 also includes a lower gate 46 which serves to define another portion of the restricting portion 18.

As the water flows between the gates 42,46, its flow is restricted. In this restricted area the pressure of the water decreases to create a relative vacuum. The vacuum draws air into the stream of water through a conduit means 20. The conduit means 20 includes a tube 48 to receive air from the atmosphere and conduct that air to the diffuser tube 50 of the conduit means 20. The end 52 of the diffuser tube 50 is positioned in the restricting portion 18 between the lower and upper gates 46,42 respectively.

Figure 4:
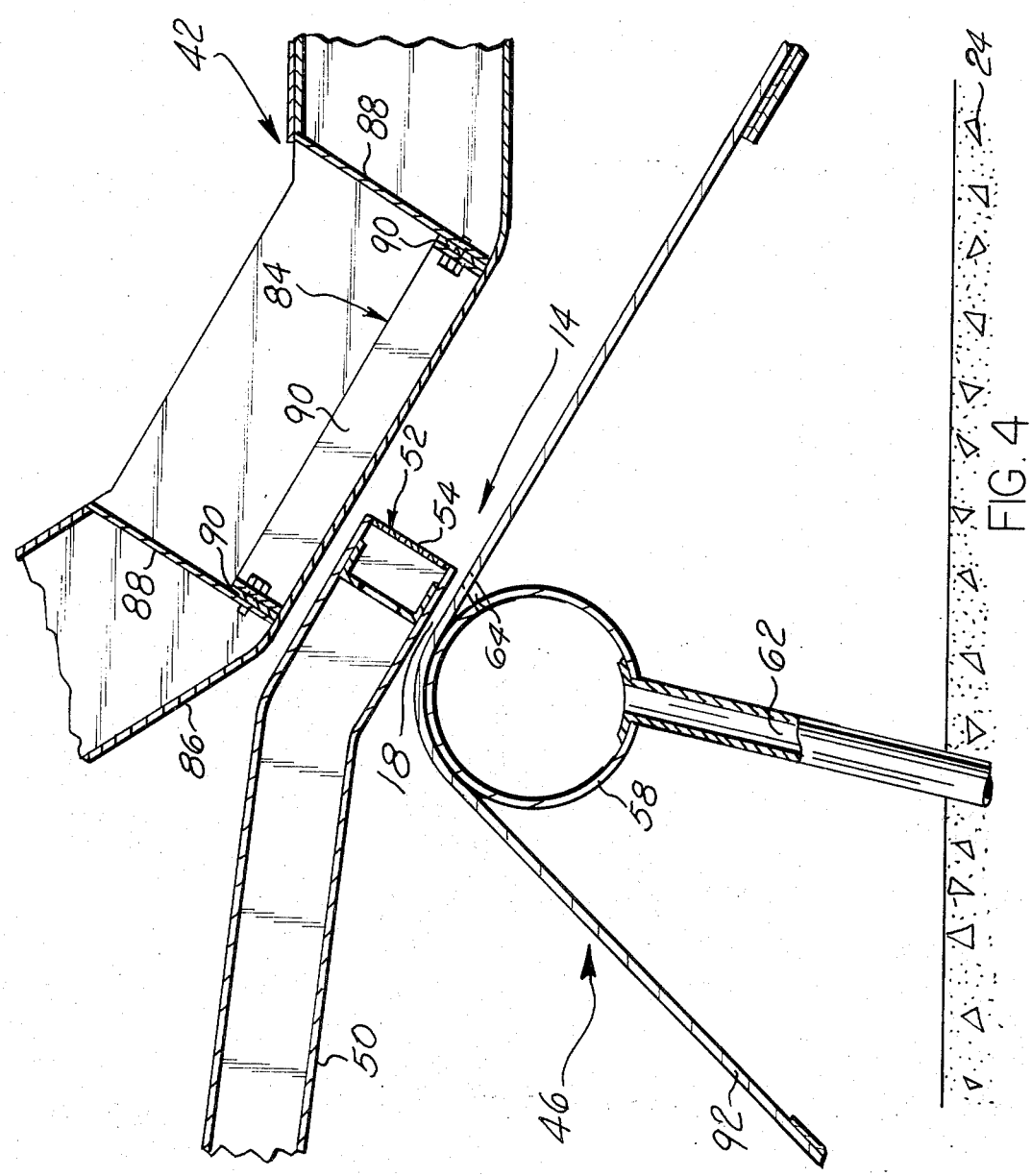
FIG. 4 is an enlarged side sectional view of a portion of the aerating apparatus of FIG. 1.

When water flows through the restricting portion 18 of the venturi device 14 due to the natural water head 16, the velocity of the water through the restricting portion increases and correspondingly the pressure decreases so that air is drawn through the tube 48, and the diffuser tube 50 and consequently into the stream of water. The end 52 (see FIG. 4) of the diffuser tube 50 is provided with an air diffuser member 54 such as a plate having a number of holes therethrough or a porous carbon plate. The air diffuser member 54 breaks the air into a number of fine bubbles which are drawn into the water flowing through the restricting portion 18. These bubbles flow with the water as it moves through venturi device 14 and are consequently dissolved in the water.

To further prolong the period of time during which these air bubbles remain in the water, a screen 56 (see FIG. 1) is secured to the upper gate 42. This screen 56 allows the water to flow in its natural course but impedes movement of the air bubbles to the surface. Since the air bubbles thereby remain in the water for a longer period of time, a greater amount of air is dissolved in the water.

In some cases it is desirable to further treat the water by inducing additional air, oxygen, ozone, chlorine or other gases or combinations thereof into the water moving through the venturi 14. To accomplish this purpose, the lower gate 46 has a tube 58 extending therealong. The tube 58 is connected to a supply of gas 60 by means of the conduit 62. When the gas is received by the tube 58, it flows from the tube 58 through a number of orifices 64 which consist of a plurality of tubes connecting the tube 58 to the stream of water moving through the restricting portion 18 of the venturi device 14. The openings 64 are of a size so that the gas is expelled therefrom in sufficiently small bubbles so as to maximize the amount of the gas dissolved in the water.

Figure 2:
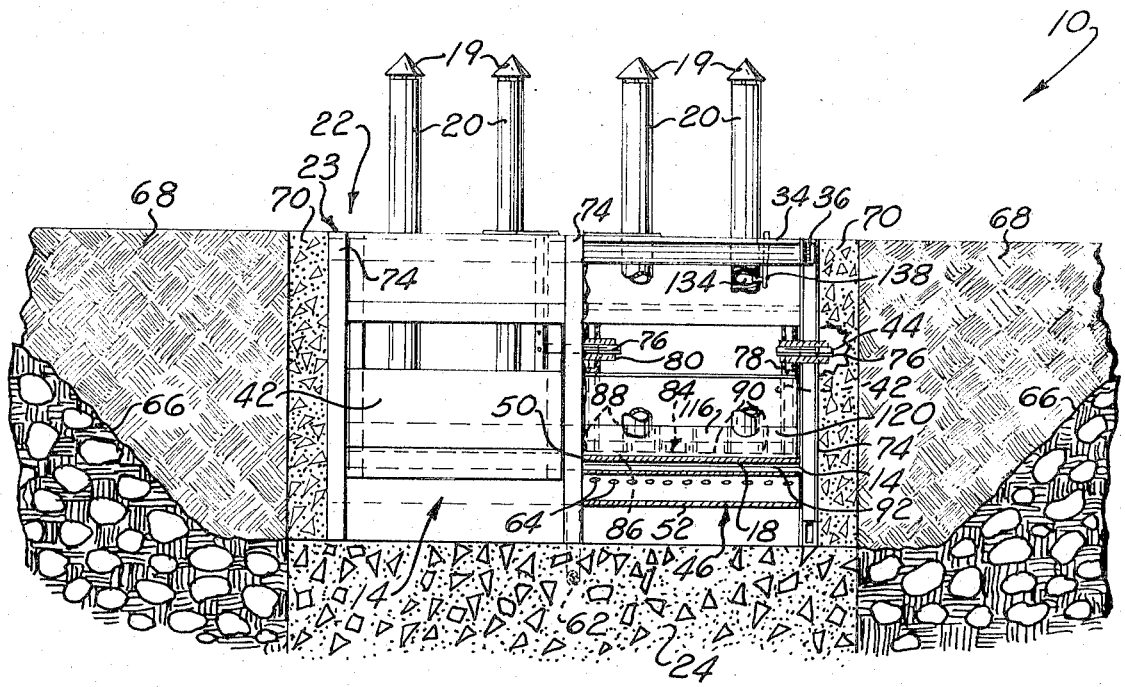
FIG. 2 is a front view of the apparatus shown in FIG. 1.

When an excessive rainfall occurs upstream, the natural upstream water level 12a increases. It is extremely desirable to control the flow of water in the stream 12a and thereby control the level 12b of the water downstream so that the excessive rainfall does not damage the downstream property. Such control is accomplished by extending the dam 22 across the opposite banks 66 of the stream 12, as shown in FIG. 2. A portion of the dam 22 includes earth fill 68 which is retained in that position by the retaining walls 70.

To accommodate the additional water retained by the dam 22 a number of venturi devices 14 may be incorporated in the dam. The dam 22 shown in FIG. 2 incorporates two venturi devices. Since a plurality of venturi's are used, the level of the water both upstream and downstream may be better controlled by the dam 22 and venturi devices 14 as will be hereinafter described. It can readily be seen that only one or both of the venturi devices may be used at one time.

For ease of description, one venturi device 14 on one side 72 of the dam 22 will be hereinafter described. It should be understood that each of the venturi devices 14 operate in a similar manner and are similar in construction.

To control the flow of the water through the dam 22, the upper gate 42 is rotatable about the pivotal axis 44 so that the size of the restricting portion 18 may be increased or decreased. To pivot the upper gate 42 about the axis 44, the frame 23 has upright members 74 having pivot pins 76 mounted therein. The upper gate 42 has a channel member 78 having a bearing 80 for rotatably receiving the pin 76. The frame member 78 extends along the surface portion 86 of the upper gate which is in contact with the upstream water.

A cover device 84 (FIG. 4) is mounted between the opposing members 78 and is removable to allow easy access to service the venturi and particularly the air diffuser member 54. The cover device 84 defines a portion of the surface 86 which guides the water as it flows through the venturi device 14. The cover member 84 consists of a number of reinforcing members 88 and the upturned plate members 90 which are connected to each other through the reinforcing members 88 and on the ends to the members 78 to define a continuous surface 86 which guides the water.

The lower gate generally indicated at 46 consists of a member 92 which is wrapped around the pipe 58 in the configuration as seen in FIG. 1. The member 92 wraps around the pipe 58 to smoothly guide the water into the restricting portion 18 of the venturi device 14. As hereinabove pointed out, the pipe 58 has openings 64 extending therethrough to conduct the gas introduced into the pipe 58 into the stream of water passing through the restricting portion 18.

The panel sections 90 of the upper gate 42 are removable so that the air diffuser 14 may be cleaned and serviced. A ladder 102 is provided to allow a person to descend into the upper gate 42 to service the diffuser 14 and desilt the apparatus 10.

To prohibit water from flowing between the upper gate 42 and frame 23, the frame includes a member 104 secured thereto having a curvature conforming to the path through which the upper edge 106 of the upper gate 42 moves. The upper edge of the gate 42 includes seal 108 which extends around the peripheral portion of the gate and is in constant contact with the frame 23. This seal 108 allows the upper gate 42 to be movable without allowing water to flow between the gate and the frame 23.

When the upstream water level is at its normal level 12a, the upper gate 42 in is its normal operating position, indicated by solid lines at 110 in FIG. 1. If it is desirable to raise the water level 12a and decrease the flow through the dam, means 112 are provided for moving the upper gate 42 to a lower position, indicated in dotted lines at 114. The means 112 includes a power cylinder which is connected between the upper gate 42 and frame 23 and may be activated to move the upper gate 42 from the normal operating position 110 to the closed position 114. In this position, the surface 86 of the upper gate 42 is in contact with the diffuser and in moving to that position has urged the diffuser tube 50 of the conduit means 20 into communication with the lower gate 46, to thereby restrict the flow of water through the dam 22.

It should be understood that a water level sensor could be used to sense the level of the water and control the size of the restricting portion 18. Control of the restricting portion is effected by actuating the power cylinder 112 in one direction or the other. By controlling the size of the restricting portion 18, the vacuum created by the water flowing through the restricting portion is controlled so that air is constantly drawn into the stream of water passing through the venturi device 14.

It should also be understood that to accomplish this movement of the conduit means 20 the diffuser tube 50 is rotatably mounted with respect to the tube 48 by means of a manifold 120 and a rotatable connection device, generally indicated at 116. As seen in FIG. 2, the diffuser tube 50 extends across the entire restricting portion 18 of the venturi device 14 and is generally rectangular in cross-sectional configuration. Thus, when the diffuser tube 50 is in contact with both the upper gate 42 and lower gate 46, the water is restricted from flowing therethrough and the water level 12a will rise.

When there is an excessive rainfall, flooding conditions occur and it is desirable to open the gates of the dam to thereby regulate the amount of water moving therethrough. When it is desirable to so open the dam, the power cylinder 112 is actuated to move the upper gate 42 to the open position, indicated by the phantom lines 122 in FIG. 1. The diffuser tube 50 may be adjusted so that it is centrally located between the upper and lower gates 42 and 46, respectively, so as to entrain air by the venturi action, as hereinabove described. When the upper gate 42 is in such an open position 122, the natural pressure head 16, during flood conditions, remains the same, even though more water is flowing through the dam. Therefore, air is still entrained from the conduit means 20.

In order to keep rain out of the conduit means 20, a deflector 142 is provided on the top of the conduit 20 and is supported by the screen 144 extending about the circumference of the conduit 48 on the upper portion thereof. The screen 144 admits air into the conduit 48 and blocks the flow of raindrops into the conduit 48.

In some cases it is desirable to vary the amount of air available to be entrained by the water flowing through the venturi device 14. Means such as the flow control device 130 is provided, as seen in FIG. 1, to allow for such an adjustment of the amount of air drawn through the conduit means 20. The flow control device 130 includes a valve member 132 which is connected to and pivotally supported by the pin 134. A crank member 136 is connected to the pin 134 so that upon movement of the crank member 136, the butterfly valve member 132 is rotated to an open or closed position to thereby increase or decrease the flow of air through the conduit 48. A rod 138 is connected to the other end of the crank member 136 so that the crank member 136 may be moved by a person in a remote position.

It is to be understood the conduit means 20 may be of various alternate designs which provide for drawing air into the water by venturi action. One such alternate design is shown in FIG. 3, and due to the similarity in design with the embodiment shown in FIG. 1, and for ease of description, the reference numerals used to describe the embodiment shown in FIG. 1 will be used to describe similar parts thereof with the suffix "a" appended thereto.

Figure 3:
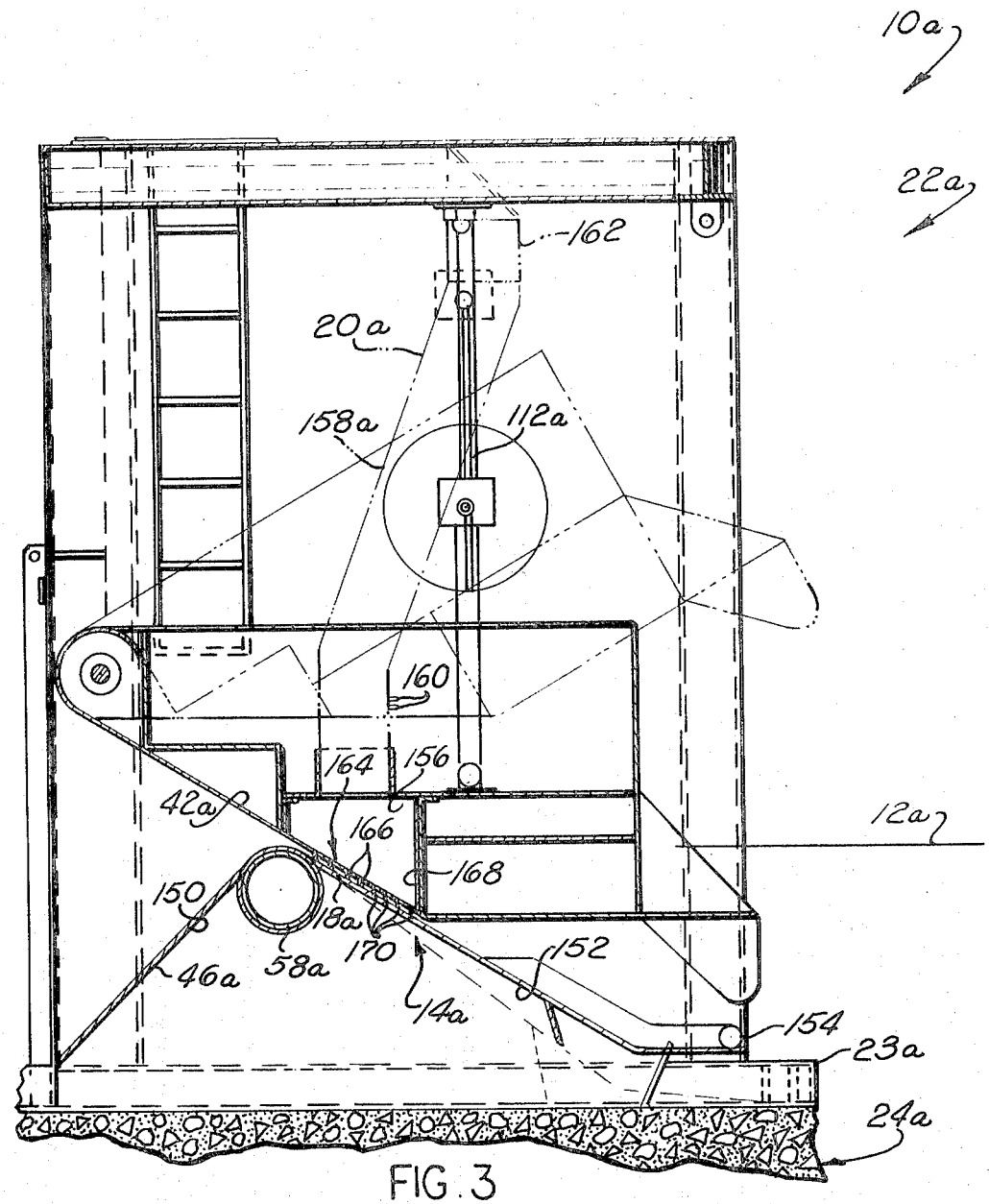
FIG. 3 is a side sectional view of an aerating apparatus similar to that as shown in FIG. 1 but of a modified construction.

The embodiment shown in FIG. 3 operates to aerate water flowing in a stream under a natural pressure head. If a greater natural pressure is desired the flow of the stream is blocked with a dam 22a.

The dam 22a includes a frame 23a connected to a foundation 24a in the riverbed. A venturi device 14a is provided in the dam and has a restricting portion 18a for restricting the flow of water therethrough. The venturi device 14a also includes a conduit means 20a to connect the water flowing through the restricting portion 18a with the atmosphere.

As the water moves through the restricting portion 18a, which is defined by an upper gate 42a and a lower gate 46a, the velocity of the water increases while its pressure decreases to create a vacuum. The amount of the vacuum created is dependent on the size of the natural pressure head and the configuration of the restricting portion 18a. The lower gate 46a is movable to vary the configuration of the restricting portion 18a and includes a member 150 which is secured to the pipe 58a. A second member 152 is also connected to the pipe 58a and defines the remainder of the lower gate 46a. The member 152 may be moved about the pipe 58a to vary the configuration of the restricting portion 18a, so that the lower gate 46a may either be at an angle or parallel to the upper gate 42a in the restricting portion 18a. The end 154 of the member 152 is secured to the frame 23a in that position by any conventional means.

to introduce air into the stream of water flowing through the restricting portion 18a, the upper gate 42a includes a manifold 156 extending across the gate 42a. Air is drawn from the atmosphere into the tube 158 of the conduit means 20a and consequently into the manifold 156. Taps 160 are provided off the conduit 158 to measure the air flow through the air tube 158. It should be understood that the conduit means 20a has a blower, schematically indicated by phantom lines at 162, mounted therein for drawing the air from the atmosphere. The blower 162 pressurizes the air flowing through the conduit means 20a to increase the amount of air drawn into the water flowing through the restricting portion 18a. Such a blower can be used to compensate for a low pressure head when there is an insufficient vacuum created by the venturi action to draw air into the water.

To introduce the air contained in the manifold 156 into the stream of water, means such as the slots 164 are provided to allow the flow of air from the manifold 156 into the stream of water passing through the restricting portion 18a of the venturi device 14a. The slots 164 are formed by the openings 166 in the lower plate 168 of the manifold 156. Flaps 170 are formed from part of the lower member 164 of the manifold 156 and are angled toward the direction of flow of the water passing the restricting portion 18a.

The openings 166 extend the length of the manifold 156 so that the decreased pressure created by the water flowing through the restricting portion 18a draws or entrains air into the stream of water passing therethrough. Due to the limited size of the openings 166, the air is broken into bubbles as it is drawn into the stream to thereby increase the amount of air dissolved by the water, as hereinabove described.

The upper gate 42a is provided with means 112a to raise or lower the upper gate 42a with respect to lower gate 46a and thereby vary the level of the stream of water flowing through the dam 22a, as hereinabove described in connection with the stream 12.

It should be understood that various other alternative designs of venturi devices may be incorporated into the dam 22 which are anticipated by the present invention. For example, the venturi device 14 and the venturi device 14a may be incorporated into the same dam, if it is desirable to increase the amount of air entrained in water. Another various alternative of the present invention would include a movable lower gate which may be used in combination with a fixed upper gate or a variable upper gate.

Thus, it may be seen that the immediate invention provides a new and improved apparatus for aerating a stream of water. The present invention aerates water flowing in a stream under the influence of a natural pressure head by providing a venturi device in the path of flowing water through which the water flows under the natural pressure head.

As the water flows through the restricting portion of the venturi device, the velocity of the water increases while the pressure of the water decreases. By connecting the restricting portion to the atmosphere, the decreased pressure of the stream of water flowing through the restricting portion draws air into the water stream. the air, so entrained into the water, dissolves in the water, thereby aerating the water. Thus, the aerating system of the present invention does not require additional parts or devices such as a motor, pump, connecting means or other devices to move the water through the venturi. In addition, the immediate invention does not require any electrical or other power during operation thereof and thereby provides a system with minimum maintenance. The aerating system of the present invention may also provide a means to control the level of the stream in which it is positioned and is capable of aerating great volumes of water.

Having thus described the invention, what is claimed is:

1. An apparatus for aerating a stream of water, said apparatus comprising dam means extending between opposite banks of the stream of water for at least partially blocking a flow of water from an upstream side of said dam means to a downstream side of said dam means, said dam means including a first member, a second member cooperating with said first member to at least partially define an opening through which water passes in flowing from the upstream side of said dam means to the downstream side of said dam means, said first and second members including surface means for restricting the flow of water through said opening to increase the velocity and decrease the pressure of at least a portion of the water as it flows from the upstream side of said dam means to the downstream side of said dam means, means for moving said first member relative to said second member to vary the size of the opening and the rate of flow of water from the upstream side of said dam means to the downstream side of said dam means, said means for moving said members being operable to move at least one of said first and second members relative to the other between a closed condition blocking a flow of water from the upstream side of said dam means to the downstream side of said dam means and an open condition enabling water to flow from the upstream side of said dam means to the downstream side of said dam means, aeration means connected in fluid communication with the atmosphere and at least the portion of water which is subjected to an increase in velocity and decrease in pressure as it flows from the upstream side of said dam means to the downstream side of said dam means for conducting air to and diffusing air in the water, said aeration means including foraminous diffuser means located at the opening for dispersing in the water a flow of air which is at least partially induced by the decrease in pressure of water as it flows from the upstream side of said dam means to the downstream side of said dam means, and conduit means for conducting a flow of air to said foraminous diffuser means, said diffuser means being disposed in abutting engagement with said second member when said first and second members are in the closed condition and being spaced apart from said second member when said first and second members are in the open condition.

2. An apparatus as set forth in claim 1 further including access means for providing access to said diffuser means through said first member when said first and second members are in the closed condition.

3. An apparatus for aerating a stream of water, said apparatus comprising dam means extending between opposite banks of the stream of water for at least partially blocking a flow of water from an upstream side of said dam means to a downstream side of said dam means, said dam means including a first member, a second member cooperating with said first member to at least partially define an opening through which water passes in flowing from the upstream side of said dam means to the downstream side of said dam means, said first and second members including surface means for restricting the flow of water through said opening to increase the velocity and decrease the pressure of at least a portion of the water as it flows from the upstream side of said dam means to the downstream side of said dam means, means for moving said first member relative to said second member to vary the side of the opening and the rate of flow of water from the upstream side of said dam means to the downstream side of said dam means, and aeration means connected in fluid communication with the atmosphere and at least the portion of water which is subjected to an increase in velocity and decrease in pressure as it flows from the upstream side of said dam means to the downstream side of said dam means for conducting air to and diffusing air in the water, said aeration means including foraminous diffuser means located at the opening for dispersing in the water a flow of air which is at least partially induced by the decrease in pressure of water as it flows from the upstream side of said dam means to the downstream side of said dam means, and conduit means for conducting a flow of air to said foraminous diffuser means, and screen means connected to and extending downstream from said first member for retarding movement of bubbles of air to the surface of the water after it flows from the upstream side of said dam means to the downstream side of said dam means, said screen means being movable with said first member relative to said second member upon the occurrence of relative movement between said first and second members.

* * * * *